United States Patent
Jeong et al.

(10) Patent No.: US 11,840,654 B2
(45) Date of Patent: Dec. 12, 2023

(54) QUANTUM DOT AND PREPARING METHOD OF THE SAME

(71) Applicant: RESEARCH & BUSINESS FOUNDATION SUNGKYUNKWAN UNIVERSITY, Suwon-si (KR)

(72) Inventors: Sohee Jeong, Seoul (KR); Joong Pill Park, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 64 days.

(21) Appl. No.: 17/534,753

(22) Filed: Nov. 24, 2021

(65) Prior Publication Data
US 2022/0162501 A1    May 26, 2022

(30) Foreign Application Priority Data

Nov. 26, 2020 (KR) .................. 10-2020-0160976
Oct. 13, 2021  (KR) .................. 10-2021-0135566

(51) Int. Cl.
| | | |
|---|---|---|
| C09K 11/74 | (2006.01) | |
| C09K 11/64 | (2006.01) | |
| C09K 11/62 | (2006.01) | |
| B82Y 40/00 | (2011.01) | |
| B82Y 20/00 | (2011.01) | |

(52) U.S. Cl.
CPC .......... *C09K 11/7492* (2013.01); *C09K 11/62* (2013.01); *C09K 11/64* (2013.01); *B82Y 20/00* (2013.01); *B82Y 40/00* (2013.01)

(58) Field of Classification Search
CPC ...... C09K 11/7492; C09K 11/62; C09K 11/64
See application file for complete search history.

(56) References Cited

U.S. PATENT DOCUMENTS

| | | | | |
|---|---|---|---|---|
| 2,921,876 | A * | 1/1960 | Dobratz | C07F 5/062 556/187 |
| 2,994,189 | A * | 8/1961 | Cleveland | C06B 43/00 60/214 |
| 3,444,154 | A * | 5/1969 | Shatz | C08C 19/28 525/276 |
| 3,784,682 | A * | 1/1974 | Niebylski | C01B 6/10 423/645 |
| 3,814,734 | A * | 6/1974 | Hirooka et al. | C08F 4/12 526/221 |
| 2008/0199381 | A1 * | 8/2008 | Tokumitsu | C01B 25/087 423/299 |
| 2010/0240770 | A1 * | 9/2010 | Qi | H01L 21/02601 977/773 |

FOREIGN PATENT DOCUMENTS

| KR | 2016-0136913 | * 11/2016 |
|---|---|---|
| KR | 10-1768998 B1 | 8/2017 |

\* cited by examiner

*Primary Examiner* — C Melissa Koslow
(74) *Attorney, Agent, or Firm* — NSIP Law

(57) ABSTRACT

Provided is a preparing method of a quantum dot, including a process of preparing a solution containing a group III precursor and a solvent, a process of reducing a group V precursor by using a compound represented by Chemical Formula 1, and a process of mixing the solution with the reduced group V precursor.

13 Claims, 6 Drawing Sheets

QUANTUM DOT AND PREPARING METHOD OF THE SAME

CROSS-REFERENCE TO RELATED APPLICATIONS

This application claims the priority of Korean Patent Application No. 10-2020-0160976 filed on Nov. 26, 2020 and Korean Patent Application No. 10-2021-0135566 filed on Oct. 13, 2021, in the Korean Intellectual Property Office, the disclosure of which is incorporated herein by reference.

BACKGROUND

Field

The present disclosure relates to a quantum dot and a preparing method of the same.

Description of the Related Art

Quantum dots refer to nanoparticles of a semiconductor of which particle size is less than tens of nanometers, and quantum dots in bulk exhibit excellent optical and electrical properties, unlike a semiconductor material, due to the quantum limiting effect.

Specifically, a band gap can be regulated by regulating the size of a quantum dot, and, thus, the absorption wavelength can be changed. That is, even if quantum dots are made of the same material, they may emit different colors of light depending on the particle size. As a particle decreases in size, the particle emits fluorescence with a shorter wavelength. As a particle increases in size, the wavelength is shifted to longer wavelengths. Since a semiconductor-based quantum dot has an extinction coefficient 100 to 1000 times higher than a general organic fluorescent material and a higher quantum efficiency than the general organic fluorescent material, the semiconductor-based quantum dot generates very strong fluorescence.

Due to such unique optical and electrical properties of quantum dots, techniques for applying quantum dots to various fields including solar cells, photoelectric conversion elements such as light emitting diodes, next-generation high luminescence LEDs, biosensors, lasers, etc. are being researched actively.

Conventional representative group II-VI compound semiconductor quantum dots have been researched with a lot of attention because of their merits such as high luminous efficiency and stability. However, group II-VI compound semiconductor quantum dots contain $Cd^{2+}$ and $Se^{2-}$ and thus cause risks of environmental damage and toxicity. Also, group II-VI compound semiconductor quantum dots may harmfully affect humans when applied to the biological fields.

Accordingly, there is a recent tendency to research group III-V binary compound semiconductors and group I-III-V ternary compound semiconductors which can substitute for group II-VI quantum dots.

Group V compounds composed of the tris(trimethylsilyl) group are difficult to handle and expensive. In order to substitute for them, a synthesis method using amine-based group V compounds has been developed. However, a group V precursor such as arsenide uses a reducing agent having a strong reducing power to reduce a group V compound having a low reactivity. Therefore, due to a high reactivity, it is difficult to control an intermediate stage, diversify synthesis methods or variously and stably regulate the sizes and shapes of quantum dots. Also, it is difficult to grow particles to sufficient sizes.

Therefore, the development of techniques for growing III-V quantum dots to various sizes by stably regulating the sizes of the III-V quantum dots is needed.

Korean Patent No. 1768998, which is the background technology of the present disclosure, relates to a method for manufacturing a quantum dot using a nanocluster and specifically relates to a method for manufacturing a quantum dot, including a process of preparing a nanocluster that contains a semiconductor compound and has an amorphous phase, a process of preparing a seed particle that contains the same semiconductor compound as the nanocluster, has a greater diameter than the nanocluster and has a crystalline phase, and a process of forming a quantum dot, which is greater than the seed particle, by reacting the seed particle with the nanocluster, but does not describe a method of preparing a quantum dot whose diameter is regulated depending on the temperature range by using a reducing agent.

SUMMARY

An object to be achieved by the present disclosure is to provide a quantum dot and a preparing method of the same.

Further, another object to be achieved by the present disclosure is to provide an electronic device including the quantum dot.

The objects of the present disclosure are not limited to the above-described objects, and there may be other objects of the present disclosure.

According to a first aspect of the present disclosure, there is provided a preparing method of a quantum dot, including a process of preparing a solution containing a group III precursor and a solvent, a process of reducing a group V precursor by using a compound represented by Chemical Formula 1, and a process of mixing the solution with the reduced group V precursor:

R-M-R [Chemical Formula 1]

(in Chemical Formula 1, R is hydrogen or a linear or branched $C_1$-$C_6$ alkyl group, and M is a group II metal).

According to an embodiment of the present disclosure, the process of mixing may be performed in a temperature range of from 1° C. to 350° ° C., but may not be limited thereto.

According to an embodiment of the present disclosure, a diameter of the quantum dot may be regulated depending on the temperature range, but may not be limited thereto.

According to an embodiment of the present disclosure, a group III element of the group III precursor may include a member selected from the group consisting of indium, aluminum, gallium and combinations thereof, but may not be limited thereto.

According to an embodiment of the present disclosure, the group III precursor may include a member selected from the group consisting of indium chloride, indium iodide, indium chloride tetrahydrate, indium oxide, indium nitrate, indium nitrate hydrate, indium sulfate, indium sulfate hydrate, indium acetate, indium acetylacetonate, indium bromide, indium fluoride, indium fluoride trihydrate, trimethyl indium, indium oleate, indium carboxylate, aluminum acetate, aluminum iodide, aluminum bromide, aluminum chloride, aluminum chloride hexahydrate, aluminum fluoride, aluminum nitrate, aluminum oxide, aluminum perchlorate, aluminum carbide, aluminum stearate, aluminum sulfate, di-i-butylaluminum chloride, diethylaluminum chloride, tri-i-butylaluminum, triethylaluminum, triethyl(tri-sec-butoxy)dialuminum, aluminum phosphate, aluminum acetylacetonate, trimethylaluminum, gallium acetylacetonate, gallium chloride, gallium fluoride, gallium fluoride trihydrate, gallium oxide, gallium nitrate, gallium nitrate hydrate, gallium sulfate, gallium iodide, triethyl gallium, trimethyl gallium and combinations thereof, but may not be limited thereto.

According to an embodiment of the present disclosure, the solvent may include a member selected from the group consisting of oleylamine, butylamine, octylamine, dodecylamine, hexadecylamine, hexylamine, propylamine, aniline, benzylamine, octadecylamine and combinations thereof, but may not be limited thereto.

According to an embodiment of the present disclosure, the group II metal may include a member selected from the group consisting of zinc, cadmium, mercury and combinations thereof, but may not be limited thereto.

According to an embodiment of the present disclosure, the compound may include a member selected from the group consisting of diethyl zinc, dimethyl zinc, diphenyl zinc, di-n-propyl zinc, di-n-butyl zinc, diisobutyl zinc, di-n-pentyl zinc, di-n-hexyl zinc, dicyclo hexyl zinc, diethyl cadmium, dimethyl cadmium, diphenyl cadmium, di-n-propyl cadmium, di-n-butyl cadmium, diisobutyl cadmium, di-n-pentyl cadmium, di-n-hexyl cadmium, dicyclo hexyl cadmium, diethyl mercury, dimethyl mercury, diphenyl mercury, di-n-propyl mercury, di-n-butyl mercury, diisobutyl mercury, di-n-pentyl mercury, di-n-hexyl mercury, dicyclo hexyl mercury and combinations thereof, but may not be limited thereto.

According to an embodiment of the present disclosure, a group V element of the group V precursor may include a member selected from the group consisting of arsenic (As), nitrogen (N), phosphorus (P) and combinations thereof, but may not be limited thereto.

According to an embodiment of the present disclosure, the group V precursor may include a member selected from the group consisting of dimethylamino arsine, arsenic oxide, arsenic chloride, arsenic sulfate, arsenic bromide, arsenic iodide, tris(trimethylsilyl)arsenide, arsenic trioxide, arsenic silylamide, alkyl phosphine, tris(trialkylsilyl) phosphine, tris(dialkylsilyl) phosphine, tris(dialkylamino) phosphine, nitric oxide, nitric acid, ammonium nitrate and combinations thereof, but may not be limited thereto.

According to a second aspect of the present disclosure, there is provided a quantum dot prepared by the preparing method according to the first aspect of the present disclosure.

According to an embodiment of the present disclosure, the quantum dot may contain a group III-V compound, but may not be limited thereto.

According to an embodiment of the present disclosure, the quantum dot may include a member selected from the group consisting of indium arsenide (InAs), indium phosphorus (InP), indium antimonide (InSb), indium nitride (InN), gallium phosphorus (GaP), gallium arsenide (GaAs), gallium antimonide (GaSb), gallium nitride (GaN), aluminum phosphorus (AlP), aluminum arsenide (AlAs), aluminum antimonide (AlSb), aluminum nitride (AlN), gallium phosphorus arsenide (GaPAs), gallium phosphorus antimonide (GaPSb), gallium phosphorus nitride (GaPN), gallium arsenidenitride (GaAsN), gallium antimonynitride (GaSbN), aluminum phosphorus arsenide (AlPAs), aluminum phosphorus antimonide (AlPSb), aluminum phosphorus nitride (AlPN), aluminum arsenide nitride (AlAsN), aluminum antimony nitride (AlSbN), indium phosphorus arsenide (InPAs), indium phosphorus antimonide (InPSb), indium phosphorusnitride (InPN), indium arsenide nitride (InAsN), indium antimony nitride (InSbN), aluminum gallium phosphorus (AlGaP), aluminum gallium arsenide (AlGaAs), aluminum gallium antimonide (AlGaSb), aluminum gallium nitride (AlGaN), indium gallium phosphorus (InGaP), indium gallium arsenide (InGaAs), indium gallium antimonide (InGaSb), indium gallium nitride (InGaN), aluminum indium phosphorus (AlInP), aluminum indium arsenide (AlInAs), aluminum indium antimonide (AlInSb), aluminum indium nitride (AlInN), gallium aluminum phosphorus arsenide (GaAlPAs), gallium aluminum phosphorus antimonide (GaAlPSb), gallium indium phosphorus arsenide (GaInPAs), gallium indium aluminum arsenide (GaInAlAs), gallium aluminum phosphorus nitride (GaAlPN), gallium aluminum arsenide nitride (GaAlAsN), gallium aluminum antimony nitride (GaAlSbN), gallium indium phosphorus nitride (GaInPN), gallium indium arsenide nitride (GaInAsN), gallium indium aluminum nitride (GaInAlN), gallium antimonyphosphorus nitride (GaSbPN), gallium arsenide phosphorus nitride (GaAsPN), gallium arsenideantimonynitride (GaAsSbN), gallium indium phosphorus antimonide (GaInPSb), gallium indium antimony nitride (GaInSbN), gallium phosphorus antimony nitride (GaPSbN), indium aluminum phosphorus arsenide (InAlPAs), indium aluminum phosphorus nitride (InAlPN), indium phosphorus arsenide nitride (InPAsN), indium aluminum antimony nitride (InAlSbN), indium phosphorus antimony nitride (InPSbN), indium arsenide antimony nitride (InAsSbN), indium aluminum phosphorus antimonide (InAlPSb) and combinations thereof, but may not be limited thereto.

According to an embodiment of the present disclosure, the quantum dot may have a diameter of from 1.6 nm to 9.5 nm, but may not be limited thereto.

According to a third aspect of the present disclosure, there is provided an electronic device including the quantum dot according to the second aspect of the present disclosure.

The above-described aspects are provided by way of illustration only and should not be construed as liming the present disclosure. Besides the above-described exemplary embodiments, there may be additional exemplary embodiments described in the accompanying drawings and the detailed description.

A conventional preparing method of a III-V quantum dot uses a reducing agent having a strong reducing power to reduce a group V compound having a low reactivity. Therefore, due to a high reactivity, it is difficult to control an intermediate stage or grow particles to sufficient sizes. However, a preparing method of a quantum dot according to the present disclosure uses an alkyl group donor with an R-M-R (R: alkyl group, M: group II metal) structure having a relatively low reactivity to synthesize a novel intermediate with a controlled reactivity through a ligand exchange reaction. Thus, it is possible to control an intermediate stage of synthesis of a quantum dot. Therefore, it is possible to grow III-V quantum dots to uniform and sufficient sizes by stably regulating the sizes of the III-V quantum dots depending on the temperature range.

Also, the conventional preparing method of a III-V quantum dot uses a reducing agent having a strong reducing power to reduce a group V compound having a low reactivity. Therefore, due to a high reactivity, it is difficult to diversify synthesis methods or variously regulate the sizes and shapes of quantum dots. However, the preparing method of a quantum dot according to the present disclosure can control an intermediate stage of synthesis of a quantum dot. Therefore, it is possible to variously regulate the sizes and shapes of quantum dots depending on the temperature range.

Further, the preparing method of a quantum dot according to the present disclosure can control an intermediate stage of synthesis of a quantum dot. Therefore, it is possible to diversify synthesis methods.

Furthermore, the preparing method of a quantum dot according to the present disclosure uses a reducing agent containing a group II metal. Thus, the group II metal can remove a defect on the surface of a quantum dot and stabilize the surface of the quantum dot. Therefore, it is possible to prepare a quantum dot whose defect on the surface has been removed and electrical and optical properties have been improved.

Moreover, the preparing method of a quantum dot according to the present disclosure uses a group V precursor which is cheap and easy to handle. Therefore, it is possible to reduce production costs and achieve mass production with high convenience and economic efficiency.

Also, quantum dots according to the present disclosure can be regulated to have uniform sizes in the range of from about 1.6 nm to about 9.5 nm and thus can be industrially used in various fields including solar cells, photoelectric conversion elements such as light emitting diodes, next-generation high luminescence LEDs, biosensors, lasers, etc.

Further, the quantum dots according to the present disclosure have uniform particle size distribution and exhibit excellent electrical and optical properties since defects on the surfaces thereof have been removed. Therefore, the quantum dots according to the present disclosure can be usefully used in electronic devices of various fields including solar cells, photoelectric conversion elements such as light emitting diodes, next-generation high luminescence LEDs, biosensors, lasers, etc.

The effects to be achieved by the present disclosure are not limited to the above-described effects, and there may be other effects of the present disclosure.

BRIEF DESCRIPTION OF THE DRAWINGS

The above and other aspects, features and other advantages of the present disclosure will be more clearly understood from the following detailed description taken in conjunction with the accompanying drawings, in which.

Figure 2:
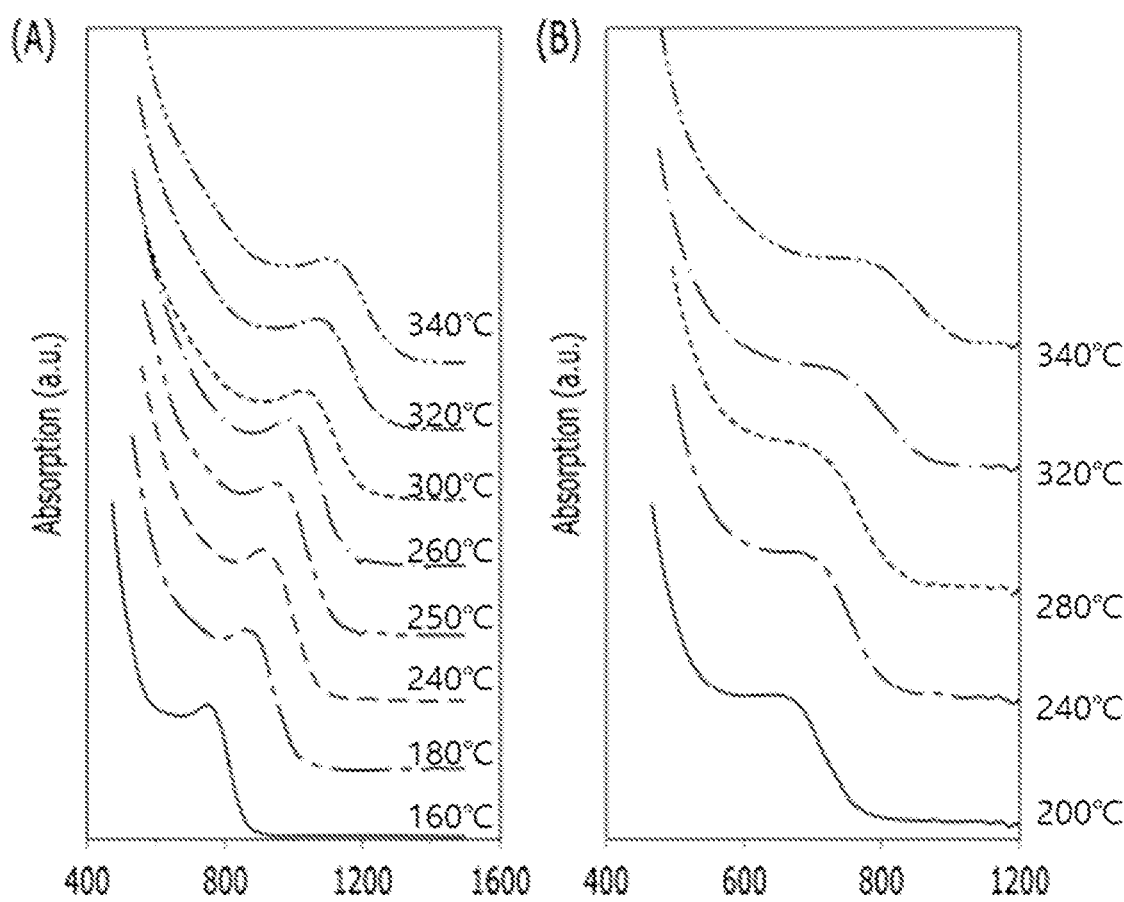
Figure 3:
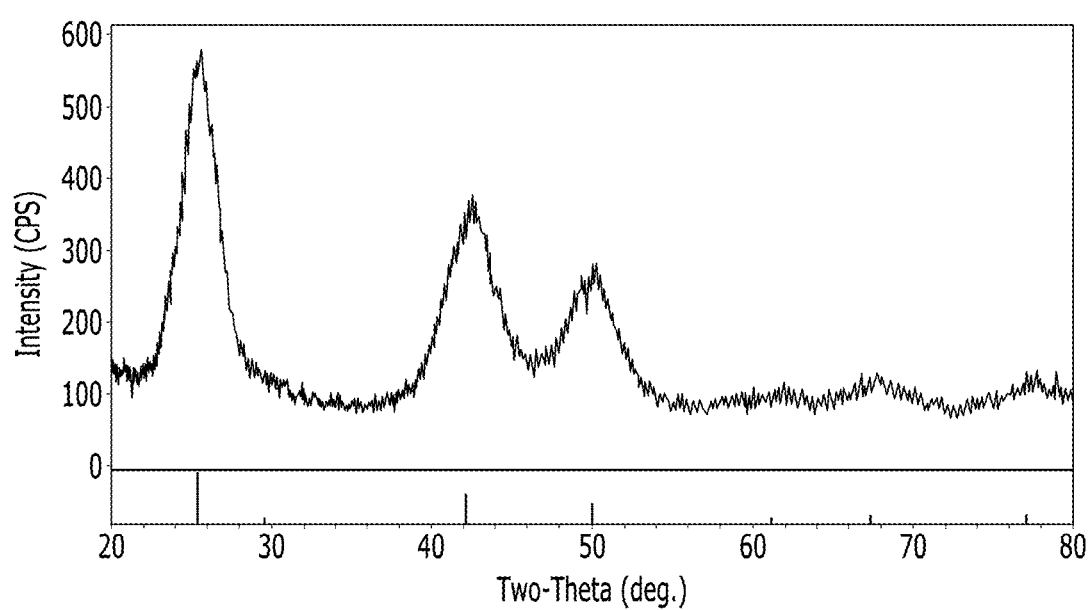
Figure 4:
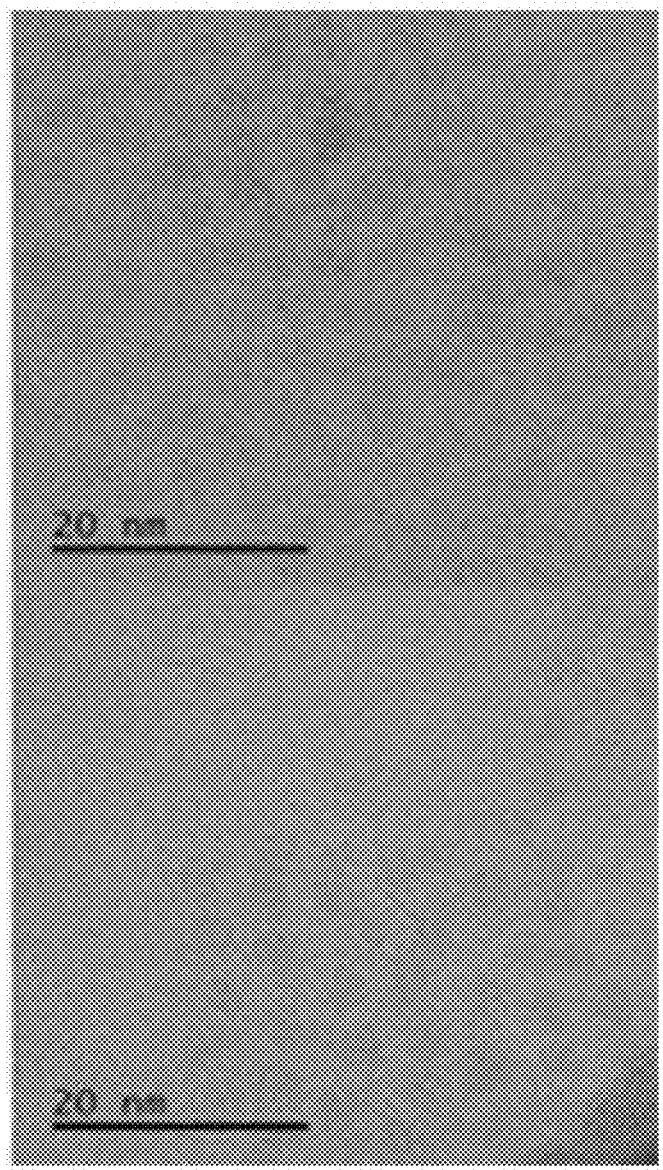
Figure 5:
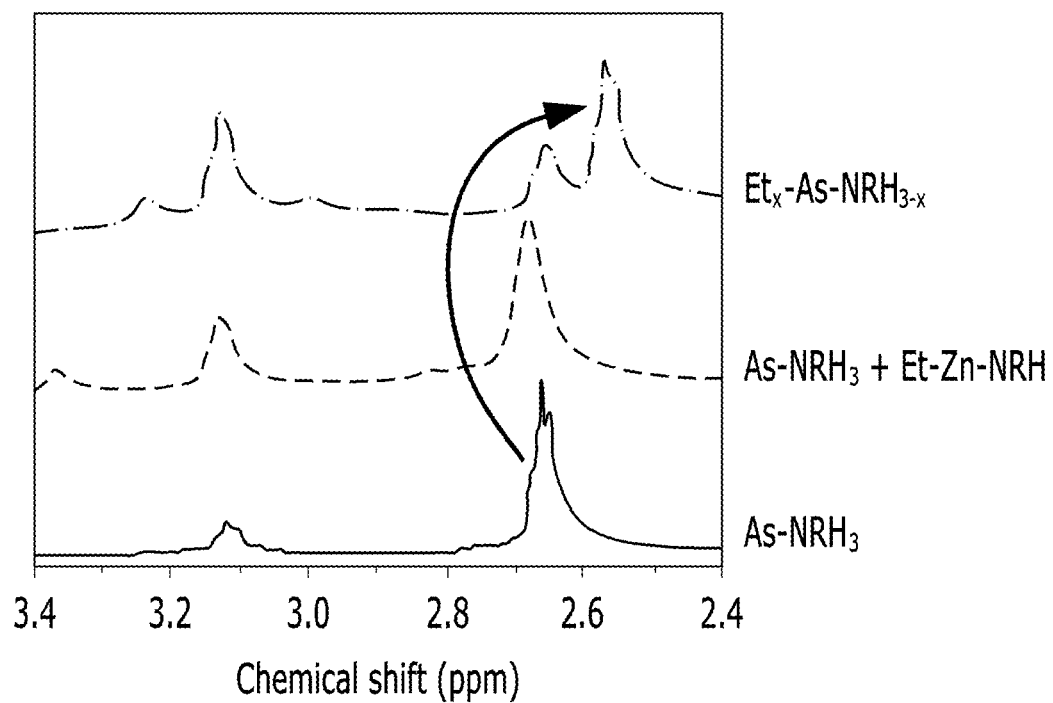
Figure 6:
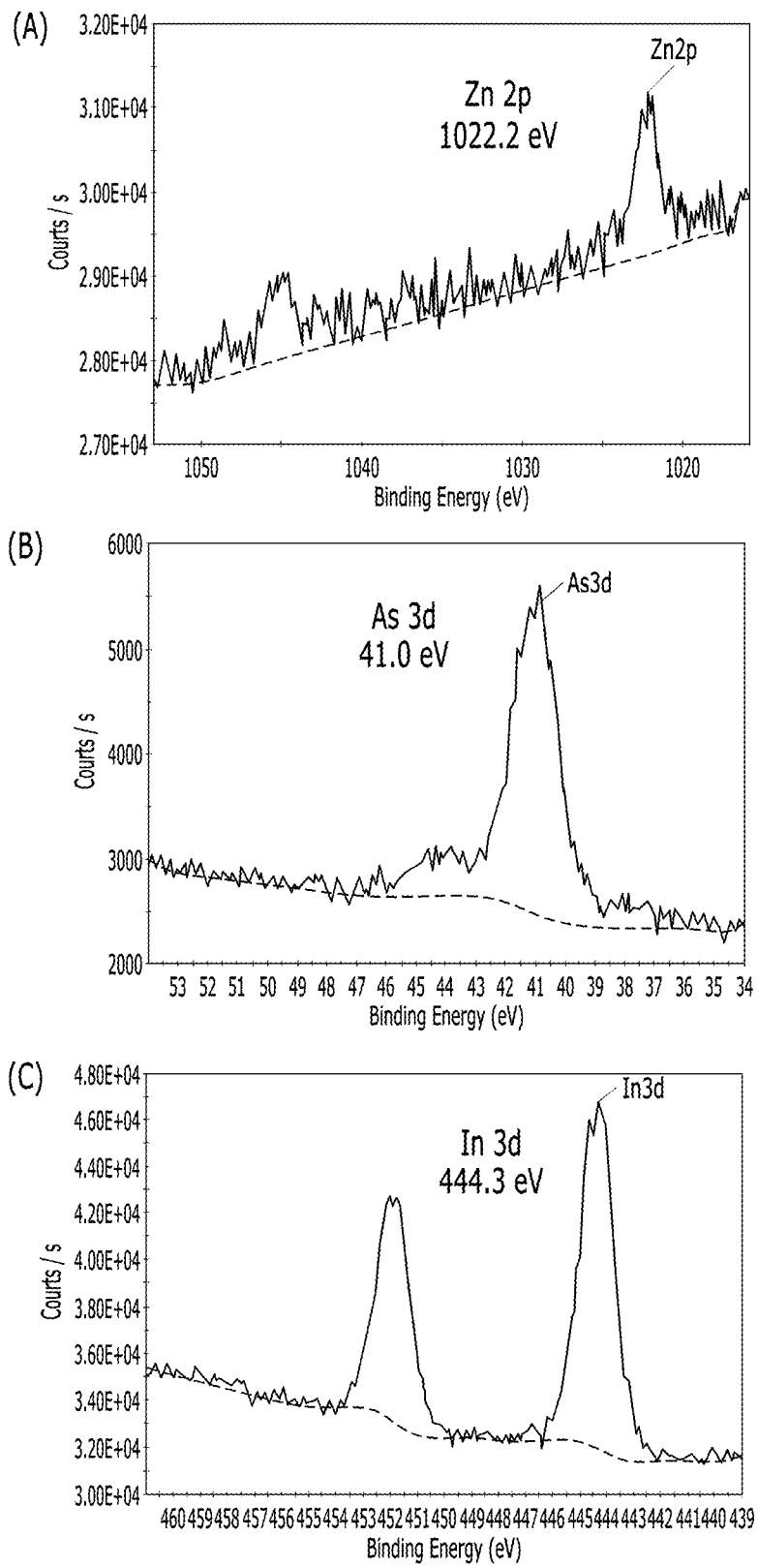

(A) and (B) of FIG. 2 show graphs of absorption wavelengths of quantum dots according to an example of the present disclosure;

FIG. 3 shows an XRD pattern of quantum dots according to an example of the present disclosure;

FIG. 4 shows TEM images of quantum dots according to an example of the present disclosure;

FIG. 5 shows nuclear magnetic resonance (NMR) spectra of quantum dots according to an example of the present disclosure; and (A), (B) and (C) of FIG. 6 show the results of X-ray photoelectron spectroscopic analysis of quantum dots according to an example of the present disclosure.

DETAILED DESCRIPTION OF THE EMBODIMENT

Hereafter, exemplary embodiments will be described in detail with reference to the accompanying drawings so that the present disclosure may be readily implemented by a person with ordinary skill in the art. However, it is to be noted that the present disclosure is not limited to the exemplary embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected to" another element and an element being "electronically connected to" another element via another element.

Through the whole document, the terms "on", "above", "on an upper end", "below", "under", and "on a lower end" that are used to designate a position of one element with respect to another element include both a case that the one element is adjacent to the other element and a case that any other element exists between these two elements.

Through the whole document, it is to be understood that the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Hereafter, a quantum dot and a preparing method of the quantum dot of the present disclosure will be described in detail with reference to embodiments, examples and the accompanying drawings. However, the present disclosure is not limited to the following embodiments, examples and drawings.

According to a first aspect of the present disclosure, there is provided a preparing method of a quantum dot, including a process of preparing a solution containing a group III precursor and a solvent, a process of reducing a group V precursor by using a compound represented by Chemical Formula 1, and a process of mixing the solution with the reduced group V precursor:

R-M-R [Chemical Formula 1]

(in Chemical Formula 1, R is hydrogen or a linear or branched $C_1$-$C_6$ alkyl group, and M is a group II metal).

Figure 1:
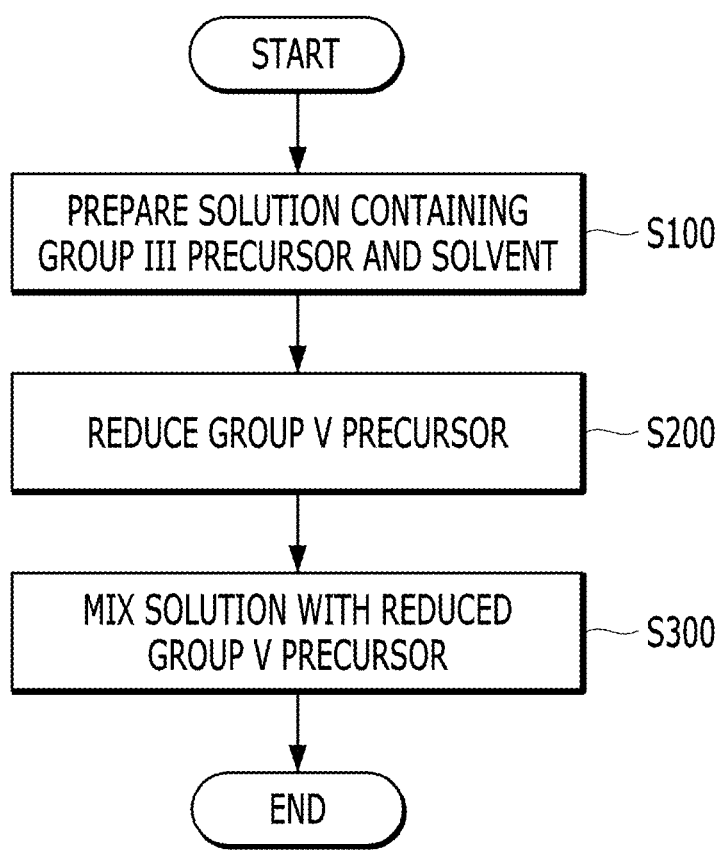
FIG. 1 is a flowchart illustrating an example processing flow for preparing a quantum dot according to an exemplary embodiment of the present disclosure.

FIG. 1 is a flowchart illustrating an example processing flow for preparing a quantum dot according to an exemplary embodiment of the present disclosure.

A band gap can be regulated by regulating the size of a quantum dot, and, thus, the absorption wavelength can be changed. That is, even if quantum dots are made of the same material, they may emit different colors of light depending on the particle size. As a particle decreases in size, the particle emits fluorescence with a shorter wavelength. As a particle increases in size, the wavelength is shifted to longer wavelengths. Since a semiconductor-based quantum dot has an extinction coefficient 100 to 1000 times higher than a general organic fluorescent material and a higher quantum efficiency than the general organic fluorescent material, the semiconductor-based quantum dot generates very strong fluorescence.

Therefore, the development of techniques for growing quantum dots to various sizes by stably regulating the sizes of the quantum dots is needed.

To prepare the quantum dot, a process of preparing a solution containing a group III precursor and a solvent is performed (S100).

According to an embodiment of the present disclosure, a group III element of the group III precursor may include a member selected from the group consisting of indium, aluminum, gallium and combinations thereof, but may not be limited thereto.

For example, the group III element of the group III precursor may be indium, but may not be limited thereto.

According to an embodiment of the present disclosure, the group III precursor may include a member selected from the group consisting of indium chloride, indium iodide, indium chloride tetrahydrate, indium oxide, indium nitrate, indium nitrate hydrate, indium sulfate, indium sulfate hydrate, indium acetate, indium acetylacetonate, indium bromide, indium fluoride, indium fluoride trihydrate, trimethyl indium, indium oleate, indium carboxylate, aluminum acetate, aluminum iodide, aluminum bromide, aluminum chloride, aluminum chloride hexahydrate, aluminum fluoride, aluminum nitrate, aluminum oxide, aluminum perchlorate, aluminum carbide, aluminum stearate, aluminum sulfate, di-i-butylaluminum chloride, diethylaluminum chloride, tri-i-butylaluminum, triethylaluminum, triethyl(tri-sec-butoxy)dialuminum, aluminum phosphate, aluminum acetylacetonate, trimethylaluminum, gallium acetylacetonate, gallium chloride, gallium fluoride, gallium fluoride trihydrate, gallium oxide, gallium nitrate, gallium nitrate hydrate, gallium sulfate, gallium iodide, triethyl gallium, trimethyl gallium and combinations thereof, but may not be limited thereto.

For example, the group III precursor may be indium chloride, but may not be limited thereto.

Indium chloride as one of indium halide precursors is relatively cheap and easy to handle. Therefore, if indium chloride is used as the group III precursor, it is possible to reduce production costs.

According to an embodiment of the present disclosure, the solvent may include a member selected from the group consisting of oleylamine, butylamine, octylamine, dodecylamine, hexadecylamine, hexylamine, propylamine, aniline, benzylamine, octadecylamine and combinations thereof, but may not be limited thereto.

The solvent may further include trioctylamine (TOA), trioctylphosphine (TOP), trioctylphosphine oxide (TOPO), 1-octadecene (ODE) and solvents typically used for synthesizing a quantum dot, but may not be limited thereto.

For example, the solvent may be oleylamine, but may not be limited thereto.

A secondary amine or tertiary amine is not available for precursor synthesis, and, thus, the solvent includes a primary amine. Oleylamine as one of primary amines has the highest BP, and, thus, its temperature can be regulated variously.

In an example, an indium oleate precursor may be formed by reacting indium chloride with oleylamine, and then an arsenide precursor may be added to make a reaction as described below.

Thereafter, a process of reducing a group V precursor by using the compound represented by Chemical Formula 1 is performed (S200).

A conventional preparing method of a III-V quantum dot uses a reducing agent having a strong reducing power to reduce a group V compound having a low reactivity. Therefore, due to a high reactivity, it is difficult to control an intermediate stage or grow particles to sufficient sizes. However, a preparing method of a quantum dot according to the present disclosure uses an alkyl group donor with an R-M-R (R: alkyl group, M: group II metal) structure having a relatively low reactivity to synthesize a novel intermediate (a reduced group V precursor) with a controlled reactivity through a ligand exchange reaction. Thus, it is possible to control an intermediate stage of synthesis of a quantum dot. Therefore, it is possible to grow III-V quantum dots to uniform and sufficient sizes by stably regulating the sizes of the III-V quantum dots depending on the temperature range.

For example, an alkyl group of the compound may substitute for an amine-V bond of dimethylamino arsine, which is a group V precursor, and reduce the group V compound to improve the reactivity of arsine and induce arsine to participate in a reaction as described below. The reduced arsine can be used in various forms and may be directly used as a reaction precursor or may be used as a precursor for growing the synthesized quantum dot.

According to an embodiment of the present disclosure, the group II metal may include a member selected from the group consisting of zinc, cadmium, mercury and combinations thereof, but may not be limited thereto.

The preparing method of a quantum dot according to the present disclosure uses a reducing agent containing a group II metal. Thus, the group II metal can remove a defect on the surface of a quantum dot and stabilize the surface of the quantum dot. Therefore, it is possible to prepare a quantum dot whose defect on the surface has been removed and electrical and optical properties have been improved.

For example, the group II metal may be zinc, but may not be limited thereto.

Specifically, zinc is modified on the surface of a quantum dot so that the properties of the quantum dot can be improved. The quantum dot whose properties are determined depending on the particle size has a very high surface-area-to-volume ratio, and, thus, it is highly important to suppress oxidation of the particle surface and remove a defect. Since the preparing method of a quantum dot according to the present disclosure uses a reducing agent containing a group II metal such as zinc, it is possible to suppress oxidation of the surface of the quantum dot and remove a defect on the surface.

According to an embodiment of the present disclosure, the compound may include a member selected from the group consisting of diethyl zinc, dimethyl zinc, diphenyl zinc, di-n-propyl zinc, di-n-butyl zinc, diisobutyl zinc, di-n-pentyl zinc, di-n-hexyl zinc, dicyclo hexyl zinc, diethyl cadmium, dimethyl cadmium, diphenyl cadmium, di-n-propyl cadmium, di-n-butyl cadmium, diisobutyl cadmium, di-n-pentyl cadmium, di-n-hexyl cadmium, dicyclo hexyl cadmium, diethyl mercury, dimethyl mercury, diphenyl mercury, di-n-propyl mercury, di-n-butyl mercury, diisobutyl mercury, di-n-pentyl mercury, di-n-hexyl mercury, dicyclo hexyl mercury and combinations thereof, but may not be limited thereto.

For example, the compound may be diethyl zinc, but may not be limited thereto.

Diethyl zinc is relatively cheap and easy to handle. Thus, if diethyl zinc is used as the compound, high convenience and economic efficiency can be achieved.

According to an embodiment of the present disclosure, a group V element of the group V precursor may include a member selected from the group consisting of arsenic (As), nitrogen (N), phosphorus (P) and combinations thereof, but may not be limited thereto.

The preparing method of a quantum dot according to the present disclosure uses a group V precursor which is cheap and easy to handle. Therefore, it is possible to reduce production costs and achieve mass production with high convenience and economic efficiency.

For example, the group V precursor may be arsenic (As), but may not be limited thereto.

According to an embodiment of the present disclosure, the group V precursor may include a member selected from the group consisting of dimethylamino arsine, arsenic oxide, arsenic chloride, arsenic sulfate, arsenic bromide, arsenic iodide, tris(trimethylsilyl)arsenide, arsenic trioxide, arsenic silylamide, alkyl phosphine, tris(trialkylsilyl) phosphine, tris(dialkylsilyl) phosphine, tris(dialkylamino) phosphine, nitric oxide, nitric acid, ammonium nitrate and combinations thereof, but may not be limited thereto.

For example, the group V precursor may be dimethylamino arsine, but may not be limited thereto.

Dimethylamino arsine is known as a compound having a low reactivity. Therefore, since a reducing agent having a strong reducing power is used for reduction, it is difficult to control an intermediate stage or grow particles to sufficient sizes due to a high reactivity.

For example, in the preparing method of a quantum dot according to the present disclosure, an alkyl group of diethyl zinc may substitute for an amine-V bond of dimethylamino arsine and reduce dimethylamino arsine to improve the reactivity of arsine and induce arsine to participate in a reaction. The reduced arsine can be used in various forms and may be directly used as a reaction precursor or may be used as a precursor for growing the synthesized quantum dot.

Then, a process of mixing the solution with the reduced group V precursor is performed (S300).

As described above, the conventional preparing method of a III-V quantum dot uses a reducing agent having a strong reducing power to reduce a group V compound having a low reactivity. Therefore, due to a high reactivity, it is difficult to diversify synthesis methods or variously regulate the sizes and shapes of quantum dots. However, the preparing method of a quantum dot according to the present disclosure uses an alkyl group donor with an R-M-R (R: alkyl group, M: group II metal) structure having a relatively low reactivity to synthesize a novel intermediate (a reduced group V precursor) with a controlled reactivity through a ligand exchange reaction. Thus, it is possible to control an intermediate stage of synthesis of a quantum dot. Therefore, it is possible to variously regulate the sizes and shapes of quantum dots depending on the temperature range.

Therefore, it is possible to easily prepare III-V quantum dots in various sizes by mixing the solution and the novel intermediate (reduced group V precursor) with a controlled reactivity and then regulating the temperature.

According to an embodiment of the present disclosure, the process of mixing may be performed in a temperature range of from about 1° C. to about 350° C., but may not be limited thereto.

According to an embodiment of the present disclosure, a diameter of the quantum dot may be regulated depending on the temperature range, but may not be limited thereto.

The process of mixing includes a process of mixing the solution and the novel intermediate (reduced group V precursor) with a controlled reactivity and a process of making a reaction to prepare a quantum dot. For example, the process of mixing may be performed at room temperature. If the reaction after mixing is performed at about 160° C., it is possible to prepare a quantum dot having a diameter of about 1.6 nm. If the reaction is performed at about 200° C., it is possible to prepare a quantum dot having a diameter of about 2.0 nm. If the reaction is performed at about 240° C., it is possible to prepare a quantum dot having a diameter of about 2.4 nm.

Further, the preparing method of a quantum dot according to the present disclosure can control an intermediate stage of synthesis of a quantum dot. Therefore, it is possible to diversify synthesis methods.

Therefore, the preparing method of a quantum dot according to the present disclosure is not limited to a single synthesis method and can be applied to all of conventional synthesis methods such as slow-injection, hot-injection and heat-up methods.

According to a second aspect of the present disclosure, there is provided a quantum dot prepared by the preparing method according to the first aspect of the present disclosure.

Detailed descriptions of the quantum dot according to the second aspect of the present disclosure, which overlap with those of the first aspect of the present disclosure, are omitted hereinafter, but the descriptions of the first aspect of the present disclosure may be identically applied to the second aspect of the present disclosure, even though they are omitted hereinafter.

According to an embodiment of the present disclosure, the quantum dot may contain a group III-V compound, but may not be limited thereto.

According to an embodiment of the present disclosure, the quantum dot may include a member selected from the group consisting of indium arsenide (InAs), indium phosphorus (InP), indium antimonide (InSb), indium nitride (InN), gallium phosphorus (GaP), gallium arsenide (GaAs), gallium antimonide (GaSb), gallium nitride (GaN), aluminum phosphorus (AlP), aluminum arsenide (AlAs), aluminum antimonide (AlSb), aluminum nitride (AlN), gallium phosphorus arsenide (GaPAs), gallium phosphorus antimonide (GaPSb), gallium phosphorus nitride (GaPN), gallium arsenidenitride (GaAsN), gallium antimonynitride (GaSbN), aluminum phosphorus arsenide (AlPAs), aluminum phosphorus antimonide (AlPSb), aluminum phosphorus nitride (AlPN), aluminum arsenide nitride (AlAsN), aluminum antimony nitride (AlSbN), indium phosphorus arsenide (InPAs), indium phosphorus antimonide (InPSb), indium phosphorusnitride (InPN), indium arsenide nitride (InAsN), indium antimony nitride (InSbN), aluminum gallium phosphorus (AlGaP), aluminum gallium arsenide (AlGaAs), aluminum gallium antimonide (AlGaSb), aluminum gallium nitride (AlGaN), indium gallium phosphorus (InGaP), indium gallium arsenide (InGaAs), indium gallium antimonide (InGaSb), indium gallium nitride (InGaN), aluminum indium phosphorus (AlInP), aluminum indium arsenide (AlInAs), aluminum indium antimonide (AlInSb), aluminum indium nitride (AlInN), gallium aluminum phosphorus arsenide (GaAlPAs), gallium aluminum phosphorus antimonide (GaAlPSb), gallium indium phosphorus arsenide (GaInPAs), gallium indium aluminum arsenide (GaInAlAs), gallium aluminum phosphorus nitride (GaAlPN), gallium aluminum arsenide nitride (GaAlAsN), gallium aluminum antimony nitride (GaAlSbN), gallium indium phosphorus nitride (GaInPN), gallium indium arsenide nitride (GaInAsN), gallium indium aluminum nitride (GaInAlN), gallium antimonyphosphorus nitride (GaSbPN), gallium arsenide phosphorus nitride (GaAsPN), gallium arsenideantimonynitride (GaAsSbN), gallium indium phosphorus antimonide (GaInPSb), gallium indium antimony nitride (GaInSbN), gallium phosphorus antimony nitride (GaPSbN), indium aluminum phosphorus arsenide (InAlPAs), indium aluminum phosphorus nitride (InAlPN), indium phosphorus arsenide nitride (InPAsN), indium aluminum antimony nitride (InAlSbN), indium phosphorus antimony nitride (InPSbN), indium arsenide antimony nitride (InAsSbN), indium aluminum phosphorus antimonide (InAlPSb) and combinations thereof, but may not be limited thereto.

For example, the quantum dot may be indium arsenide (InAs), but may not be limited thereto.

According to an embodiment of the present disclosure, the quantum dot may have a diameter of from about 1.6 nm to about 9.5 nm, but may not be limited thereto.

Quantum dots according to the present disclosure can be regulated to have uniform sizes in the range of from about 1.6 nm to about 9.5 nm and thus can be industrially used in various fields including solar cells, photoelectric conversion elements such as light emitting diodes, next-generation high luminescence LEDs, biosensors, lasers, etc.

Further, the quantum dots according to the present disclosure have uniform particle size distribution and exhibit excellent electrical and optical properties since defects on the surfaces thereof have been removed. Therefore, the quantum dots according to the present disclosure can be usefully used in electronic devices of various fields including solar cells, photoelectric conversion elements such as light emitting diodes, next-generation high luminescence LEDs, biosensors, lasers, etc.

According to a third aspect of the present disclosure, there is provided an electronic device including the quantum dot according to the second aspect of the present disclosure.

Detailed descriptions of the electronic device according to the third aspect of the present disclosure, which overlap with those of the second aspect of the present disclosure, are omitted hereinafter, but the descriptions of the second aspect of the present disclosure may be identically applied to the third aspect of the present disclosure, even though they are omitted hereinafter.

The quantum dots according to the present disclosure have uniform particle size distribution and exhibit excellent electrical and optical properties since defects on the surfaces thereof have been removed. Therefore, the quantum dots according to the present disclosure can be usefully used in electronic devices of various fields including solar cells, photoelectric conversion elements such as light emitting diodes, next-generation high luminescence LEDs, biosensors, lasers, etc.

Hereinafter, the present disclosure will be described in more detail with reference to examples. The following examples are provided only for explanation, but do not intend to limit the scope of the present disclosure.

[Example] Preparation of Quantum Dot (Indium Arsenide (InAs))

A solution containing an indium oleate precursor was prepared by reacting 0.5 mmol indium chloride and 6 ml of oleylamine at 120° C.

Then, an intermediate was synthesized by reacting 0.7 ml of oleylamine, 0.3 mmol dimethylamino arsine and 0.6 mmol diethyl zinc at 240° C. to reduce dimethylamino arsine.

Then, the solution and the reduced dimethylamino arsine (intermediate) were mixed.

Thereafter, the mixture was reacted at 160° C., 200° C. and 240° C. to prepare quantum dots having diameters of 1.6 nm, 2.0 nm and 2.4 nm, respectively.

Test Example 1

(A) and (B) of FIG. 2 show graphs of absorption wavelengths of quantum dots according to an example of the present disclosure. In an example, in the step of mixing a solution comprising a croup III precursor and a solvent with a group V precursor reduced by an R-M-R compound, the temperature can be controlled in a temperature range of 1° C. to 350° C. Therefore, according to one or more examples of the present disclosure, there is a technical effect that the size of the quantum dots can be stably controlled over a range of temperatures.

It can be seen from (A) and (B) of FIG. 2 that quantum dots of various sizes were actually fabricated over a range of temperatures.

Also, it can be seen that the preparing method of a quantum dot of the present disclosure can control an intermediate stage of synthesis of a quantum dot, and, thus, it is possible to regulate a band gap by regulating the size of the quantum dot and thus possible to change the absorption wavelength.

Test Example 2

FIG. 3 shows an XRD pattern of quantum dots according to an example of the present disclosure.

It can be seen from FIG. 3 that quantum dots prepared by the preparing method of the present disclosure show the same pattern as the conventionally known InAs pattern.

Test Example 3

FIG. 4 shows TEM images of quantum dots according to an example of the present disclosure.

It can be seen from FIG. 4 that quantum dots prepared by the preparing method of the present disclosure are spherical nanoparticles.

Test Example 4

FIG. 5 shows nuclear magnetic resonance (NMR) spectra of quantum dots according to an example of the present disclosure.

Specifically, FIG. 5 is a graph showing 1H NMR changes of oleylamine α-carbon.

A reaction path of Zn—As, i.e., a reduction mechanism of dimethylamino arsine, which is a group V precursor, can be seen from FIG. 5. Specifically, it can be seen that a chemical shift occurs from a triplet state to a singlet state and then to a triplet state (from bottom to top). This means that an As—$NRH_3$ bond is converted into As—$NRH_3$+Et-Zn—NRH and then into $E_{tx}$-As—$NRH_{3-x}$.

Test Example 5

(A), (B) and (C) of FIG. 6 show the results of X-ray photoelectron spectroscopy (XPS) analysis of quantum dots according to an example of the present disclosure.

Specifically, for the numbers shown in the graphs, (A) in FIG. 6 represents the binding energy value (1022.2 eV) of $Zn^{2+}$, (B) in FIG. 6 represents the binding energy value (41.0 eV) of As from InAs, and (C) in FIG. 6 represents the binding energy value (444.31 eV) of In from InAs.

It can be seen from FIG. 6 that Zn, In and As are observed from quantum dots prepared by the preparing method of the present disclosure.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and exemplary embodiments conceived from the meaning and scope of the claims and their equivalents are included in the scope of the present disclosure.

What is claimed is:

1. A preparing method of a quantum dot, the method comprising:
   preparing a solution containing a group III precursor and a solvent;
   reducing a group V precursor by using a compound represented by R-M-R; and
   mixing the solution with the reduced group V precursor,
   wherein R is hydrogen or a linear or branched $C_1$-$C_6$ alkyl group, and M is a group II metal.

2. The preparing method of a quantum dot according to claim 1, wherein the mixing is performed in a temperature range of from 1° C. to 350° C.

3. The preparing method of a quantum dot according to claim 2, wherein a diameter of the quantum dot is regulated depending on the temperature range.

4. The preparing method of a quantum dot according to claim 1, wherein a group III element of the group III precursor includes a member selected from the group consisting of indium, aluminum, gallium and combinations thereof.

5. The preparing method of a quantum dot according to claim 1, wherein the group III precursor includes a member selected from the group consisting of indium chloride, indium iodide, indium chloride tetrahydrate, indium oxide, indium nitrate, indium nitrate hydrate, indium sulfate, indium sulfate hydrate, indium acetate, indium acetylacetonate, indium bromide, indium fluoride, indium fluoride trihydrate, trimethyl indium, indium oleate, indium carboxylate, aluminum acetate, aluminum iodide, aluminum bromide, aluminum chloride, aluminum chloride hexahydrate, aluminum fluoride, aluminum nitrate, aluminum oxide, aluminum perchlorate, aluminum carbide, aluminum stearate, aluminum sulfate, di-i-butylaluminum chloride, diethylaluminum chloride, tri-i-butylaluminum, triethylaluminum, triethyl(tri-sec-butoxy)dialuminum, aluminum phosphate, aluminum acetylacetonate, trimethylaluminum, gallium acetylacetonate, gallium chloride, gallium fluoride, gallium fluoride trihydrate, gallium oxide, gallium nitrate, gallium nitrate hydrate, gallium sulfate, gallium iodide, triethyl gallium, trimethyl gallium and combinations thereof.

6. The preparing method of a quantum dot according to claim 1, wherein the solvent includes a member selected from the group consisting of oleylamine, butylamine, octylamine, dodecylamine, hexadecylamine, hexylamine, propylamine, aniline, benzylamine, octadecylamine and combinations thereof.

7. The preparing method of a quantum dot according to claim 1, wherein the group II metal includes a member selected from the group consisting of zinc, cadmium, mercury and combinations thereof.

8. The preparing method of a quantum dot according to claim 1, wherein the compound includes a member selected from the group consisting of diethyl zinc, dimethyl zinc, di-n-propyl zinc, di-n-butyl zinc, di-n-pentyl zinc, di-n-hexyl zinc, diethyl cadmium, dimethyl cadmium, di-n-propyl cadmium, di-n-butyl cadmium, diisobutyl cadmium, di-n-pentyl cadmium, di-n-hexyl cadmium, diethyl mercury, dimethyl mercury, di-n-propyl mercury, di-n-butyl mercury, diisobutyl mercury, di-n-pentyl mercury, di-n-hexyl mercury and combinations thereof.

9. The preparing method of a quantum dot according to claim 1, wherein a group V element of the group V precursor includes a member selected from the group consisting of arsenic (As), nitrogen (N), phosphorus (P) and combinations thereof.

10. The preparing method of a quantum dot according to claim 1, wherein the group V precursor includes a member selected from the group consisting of dimethylamino arsine, arsenic oxide, arsenic chloride, arsenic sulfate, arsenic bromide, arsenic iodide, tris(trimethylsilyl)arsenide, arsenic trioxide, arsenic silylamide, alkyl phosphine, tris(trialkylsilyl) phosphine, tris(dialkylsilyl) phosphine, tris(dialkylamino) phosphine, nitric oxide, nitric acid, ammonium nitrate and combinations thereof.

11. The preparing method of a quantum dot according to claim 1, wherein the quantum dot contains a group III-V compound.

12. The preparing method of a quantum dot according to claim 1, wherein the quantum dot includes a member selected from the group consisting of indium arsenide (InAs), indium phosphorus (InP), indium antimonide (InSb), indium nitride (InN), gallium phosphorus (GaP), gallium arsenide (GaAs), gallium antimonide (GaSb), gallium nitride (GaN), aluminum phosphorus (AlP), aluminum arsenide (AlAs), aluminum antimonide (AlSb), aluminum nitride (AlN), gallium phosphorus arsenide (GaPAs), gallium phosphorus antimonide (GaPSb), gallium phosphorus nitride (GaPN), gallium arsenidenitride (GaAsN), gallium antimonynitride (GaSbN), aluminum phosphorus arsenide (AlPAs), aluminum phosphorus antimonide (AlPSb), aluminum phosphorus nitride (AlPN), aluminum arsenide nitride (AlAsN), aluminum antimony nitride (AlSbN), indium phosphorus arsenide (InPAs), indium phosphorus antimonide (InPSb), indium phosphorusnitride (InPN), indium arsenide nitride (InAsN), indium antimony nitride (InSbN), aluminum gallium phosphorus (AlGaP), aluminum gallium arsenide (AlGaAs), aluminum gallium antimonide (AlGaSb), aluminum gallium nitride (AlGaN), indium gallium phosphorus (InGaP), indium gallium arsenide (InGaAs), indium gallium antimonide (InGaSb), indium gallium nitride (InGaN), aluminum indium phosphorus (AlInP), aluminum indium arsenide (AlInAs), aluminum indium antimonide (AlInSb), aluminum indium nitride (AlInN), gallium aluminum phosphorus arsenide (GaAlPAs), gallium aluminum phosphorus antimonide (GaAlPSb), gallium indium phosphorus arsenide (GaInPAs), gallium indium aluminum arsenide (GaInAlAs), gallium aluminum phosphorus nitride (GaAlPN), gallium aluminum arsenide nitride (GaAlAsN), gallium aluminum antimony nitride (GaAlSbN), gallium indium phosphorus nitride (GaInPN), gallium indium arsenide nitride (GaInAsN), gallium indium aluminum nitride (GaInAlN), gallium antimonyphosphorus nitride (GaSbPN), gallium arsenide phosphorus nitride (GaAsPN), gallium arsenideantimonynitride (GaAsSbN), gallium indium phosphorus antimonide (GaInPSb), gallium indium antimony nitride (GaInSbN), gallium phosphorus antimony nitride (GaPSbN), indium aluminum phosphorus arsenide (InAlPAs), indium aluminum phosphorus nitride (InAlPN), indium phosphorus arsenide nitride (InPAsN), indium aluminum antimony nitride (InAlSbN), indium phosphorus antimony nitride (InPSbN), indium arsenide antimony nitride (InAsSbN), indium aluminum phosphorus antimonide (InAlPSb) and combinations thereof.

13. The preparing method of a quantum dot according to claim 1, wherein the quantum dot has a diameter of from 1.6 nm to 9.5 nm.

\* \* \* \* \*